United States Patent [19]

Drapp et al.

[11] Patent Number: 4,613,349
[45] Date of Patent: Sep. 23, 1986

[54] FLUID SEPARATOR AND FLOW STABILIZATION STRUCTURE

[75] Inventors: Donald J. Drapp, Missouri City; Paul S. Cabler, Shiner, both of Tex.

[73] Assignee: Mini Base Systems, Inc.

[21] Appl. No.: 662,633

[22] Filed: Oct. 19, 1984

[51] Int. Cl.[4] .............................................. B01D 45/12
[52] U.S. Cl. ...................................... 55/458; 55/270; 55/459 R; 55/414; 73/200
[58] Field of Search ..................... 55/20, 21, 169, 177, 55/184, 191, 204, 205, 270, 355, 410, 414, 426, 458, 459 C, 459 R; 210/512.1; 73/200, 861.52, 861.61, 861.01, 861.02, 198, 707; 138/404

[56] References Cited

U.S. PATENT DOCUMENTS

| | | | |
|---|---|---|---|
| 375,463 | 12/1887 | Stratton | 55/426 |
| 815,407 | 3/1906 | Cooper | 55/169 |
| 1,741,207 | 12/1929 | Stratford | 55/458 |
| 2,015,839 | 10/1935 | Brown | 73/861.01 |
| 2,136,900 | 11/1938 | Wooley | 73/861.61 |
| 2,802,485 | 8/1957 | Du Bois | 73/707 |
| 2,929,248 | 3/1960 | Sprenkle | 73/861.52 |
| 3,048,035 | 8/1962 | Richards et al. | 73/200 |
| 3,883,324 | 5/1975 | Balla et al. | 55/459 R |
| 3,907,525 | 9/1975 | King | 55/122 |
| 3,996,027 | 12/1976 | Schnell et al. | 55/205 |
| 4,097,358 | 6/1978 | Wiseman | 55/459 R |
| 4,268,288 | 5/1981 | Combs | 55/458 |
| 4,429,581 | 2/1984 | Furmaga | 73/200 |

Primary Examiner—Bernard Nozick
Attorney, Agent, or Firm—Gunn, Lee & Jackson

[57] ABSTRACT

A centrifugal separator for separating liquid and solid contaminants from flowing gas and for separating certain liquids from other liquids. The centrifugal separator finds novel application as a flow stabilization system wherein the separator vessel is coupled into a natural gas flowline upstream of flow measurement equipment to minimize fluctuations of flowing natural gas, which may contain solid and liquid contaminants. The separator vessel defines an internal fluidic column within which is developed rapid cyclonic gas flow activity for separation of any liquid and solid contaminants from the gas. The vessel also defines a sump for accumulating and/or draining contaminants separated from the flowing natural gas in the fluidic column. An outlet extends into the vessel positioning an outlet opening to receive only gas from the cyclonic circulation of natural gas. The separator vessel structure also defines an accumulator and functions in concert with a back-pressure device to minimize fluctuations in pressure and velocity of the flowing gas so that the gas flow measurement equipment downstream of the vessel will provide gas flow measurement that is not influenced by such fluctuations.

18 Claims, 3 Drawing Figures

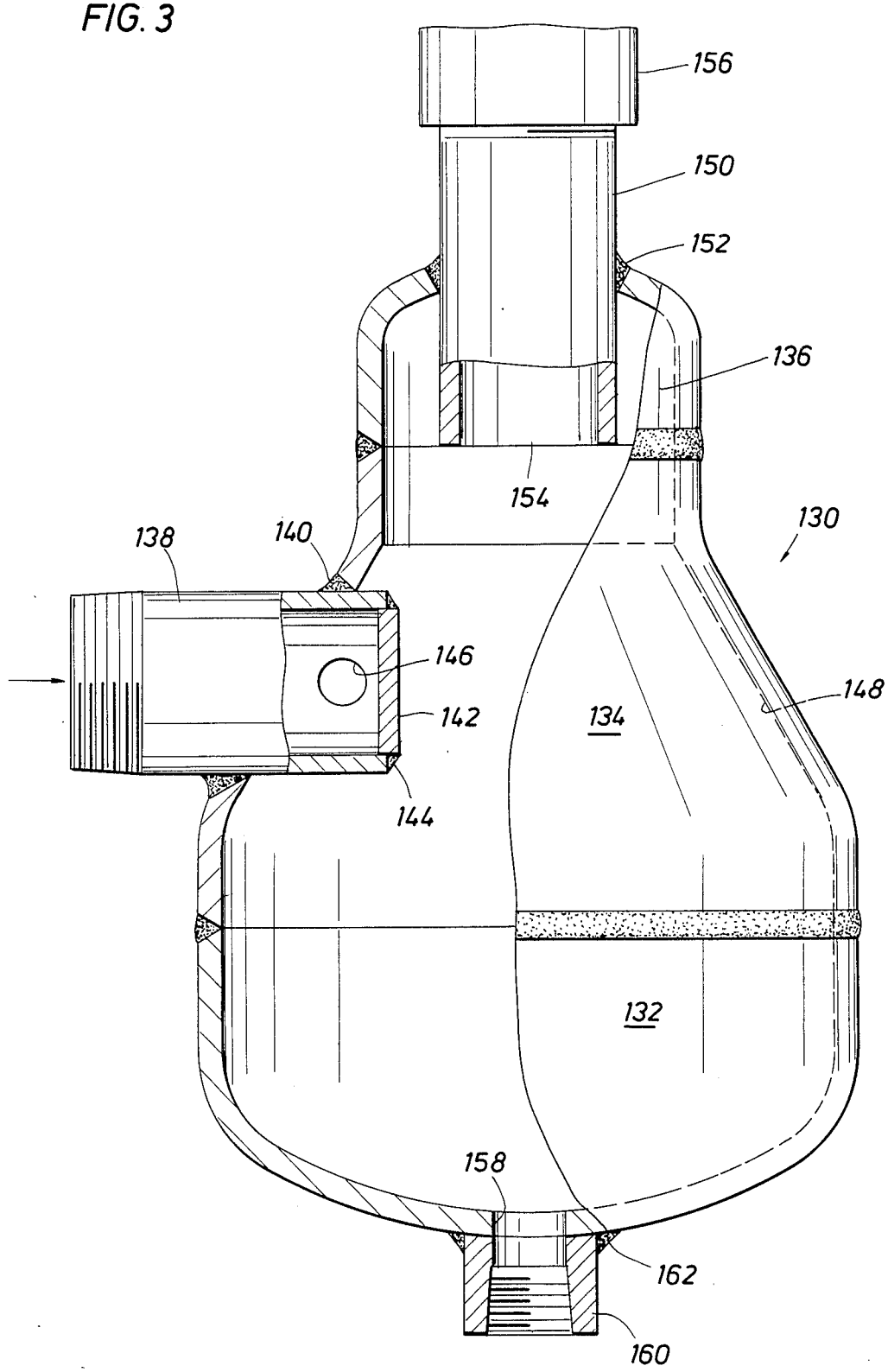

FLUID SEPARATOR AND FLOW STABILIZATION STRUCTURE

FIELD OF THE INVENTION

This invention relates generally to gas/liquid and liquid separator apparatus for fluids flowing in flowlines and which also finds particular application in systems for measuring the flow of gas, particularly natural gas being produced from a gas well. More specifically, this invention concerns the provision of a centrifugal separator vessel structure and the specific application of such vessel structure in a gas flow measurement system such as a natural gas flowline, upstream of flow measurement equipment. The separator vessel functions as a centrifugal separator, provides an internal fluidic column for cyclonic flow generation and also provides back-pressure control to ensure accurately measurable and readily recordable measurement of gas flow by the gas measurement equipment.

BACKGROUND OF THE INVENTION

In the production of natural gas from gas wells, the gas frequently contains solid contaminants such as sand, pipe scale and other debris. The producing gas also frequently contains liquid contaminants such as water and petroleum products, namely distillate and various grades of crude oil. Gas flow measurement systems have been in use for many years, which function according to various conventional gas flow measurement formulae for accurate measurement of gas flow from the well. Typically, it is necessary to identify the volume of gas flowing from each particular well of a gas field to thus identify the volume of gas being conducted from the gas field to a gas handling system such as a gas transmission pipeline. More recently, various electronic gas flow measurement systems have been developed which incorporate microcomputers that provide gas flow calculations in accordance with gas temperature, pressure, differential pressure, etc. These electronic gas flow measurement systems are quite accurate and represent a substantial improvement over mechanical gas flow measurement devices. Most electronic and mechanical gas flow measurement systems also incorporate chart recorders with flow responsive pens which cause the volume of flow to be represented by ink lines on the charts. In most cases, the charts are of circular form and chart paper is changed out after each revolution of the rotary chart has occurred. These charts are utilized as visual indications of the volume of gas being sold to purchasers.

Regardless of the type of chart employed, it is well known that the conditions of gas flow from a producing gas well frequently have significant fluctuation, thereby causing rapid cycling of the ink pen of a chart recorder, resulting in a broad ink band on the chart which is defined by the amplitude of ink pen fluctuation responsive to fluctuation of the flowing gas. These broad ink bands require significant interpretation in order to establish accuracy of the flow conditions represented by the ink lines on the chart. In many cases, the fluctuations are sufficiently wide that a wide ink band on the chart renders it virtually useless for interpretation of gas flow. Similarly, wide fluctuations detected by the measurement equipment complicate the electronic recording procedure and, in some cases, there is a wide disparity between the gas flow information physically shown on the chart and the gas flow information represented by the electronic measurement equipment.

Fluctuations in gas flow from producing gas wells is caused by changes in the pressure of the natural gas being produced from the gas formation and it is also influenced by contaminants contained within the flowing gas. Further, the accuracy of flow measurement equipment is, in many cases, significantly influenced by contaminants contained in the flowing gas and by fluctuations in gas flow. For example, water produced with the gas builds up on the orifice of an orifice fitting and introduces flow anomalies developing inaccuracy in measurement as well as inducing fluctuations across the orifice which are picked up and displayed by the metering and recording equipment. In absence of water, the gas flow will be stable and otherwise easily measured. It is highly desirable, therefore, to ensure that gas flow from a producing gas well into gas flow measurement equipment have minimal rapid fluctuations so that the volume of gas flow as well as other gas flow conditions will be represented on the chart by a thin ink line which can be accurately interpreted. Further, it is highly desirable to ensure that natural gas flowing through gas flow measurement equipment be substantially free of liquid and solid contaminants to thereby enhance the accuracy of gas flow measurement.

SUMMARY OF THE INVENTION

It is a primary feature of the present invention to provide a novel flow stabilization vessel in a gas flowline which is located upstream of flow measurement equipment and which accomplishes substantially complete separation of liquid and solid contaminants from the flowing gas prior to passage of the gas through the flow measurement equipment.

It is another important feature of this invention to provide a centrifugal separator vessel of a particular character for separation of liquids and/or solid particulate from flowing gas and to separate one liquid from another liquid.

It is also a feature of this invention to provide a novel gas flow measurement system incorporating a flow stabilization vessel which functions as an accumulator for minimizing rapid fluctuations in the flow of the gas.

It is an even further feature of this invention to provide a novel gas flow measurement system incorporating a flow stabilization vessel having a back-pressure control for flowing gas therein to thereby minimize rapid fluctuations of gas flow prior to passage of the gas through flow measurement equipment.

It is another feature of this invention to provide a gas flow measurement system incorporating a flow stabilization vessel having an internal fluidic column for separation of liquids and solids from the flowing gas, a sump receiving the separated contaminants, with the entire vessel, including the fluidic column and sump, functioning as an accumulator to minimize rapid fluctuations in gas flow to thus provide the flow measurement equipment with the capability of accurately measuring flow and producing an accurately readable representation of flow on a chart.

The term "fluid," as employed herein, means liquids or gases, or gases having liquid and/or solid particulate entrained therein. For example, flowing natural gas is typically produced from petroleum formations with small quantities of water, oil, distillate and solid particles and constitutes a fluid within the scope hereof.

Briefly, the gas liquid separator or flow stabilization vessel includes an inlet structure capable of being coupled to a fluid flowline such as a gas flowline and which directs an increased velocity jet of fluid along the tapered internal wall surface of a fluidic column defined within the vessel for development of cyclonic rotation of the flowing gas within the vessel. Below the fluidic column the vessel defines a sump for receiving separated contaminants such as solids and liquids which is produced along with the gas, the sump having a valve controlled drain at the lower portion thereof enabling selective or automatic removal of separated contaminants from the vessel. The fluidic column is formed by a flared or frusto-conical wall surface having the larger, lower extremity thereof directed toward the sump and the smaller, upper extremity thereof directed toward an outlet opening. The separator vessel has an an outlet tube, also being connectable to the flowline. In the case of gas flow measurement systems, the outlet tube connects to the flowline upstream of flow measurement equipment. The outlet tube extends into the vessel and presents an outlet opening in substantial axial registry with the axis of the cyclonic rotation defined within the fluidic column. The outlet tube extends a particular distance into the upper central portion of the vessel to ensure that only the light constituents of the cyclonic circulation, i. e. the gas, pass through the outlet tube into the flowline. A black-pressure control device is located in the flowline immediately downstream of the outlet tube, thus providing the vessel with back-pressure control which also functions to dampen or smooth out rapid fluctuations in the condition of gas flow. The gas passing into the flowline downstream of the back-pressure device is therefore substantially free of rapid fluctuations in pressure and velocity, thus providing the chart recording and flow measuring equipment with the capability of accomplishing accurate flow measurement and accurate chart recording of the conditions of flow. The orifice of the orifice fitting will have no liquid build-up that might stimulate fluctuations. Particularly, the ink pen of the chart device will describe a thin line on the chart representing the volume of flow passing through the flow measurement equipment during the charting period. Thus, the visual indication of gas flow on the chart can be accurately correlated with the electronic calculations of the flow measurement equipment to provide for efficiency of gas flow measurement for purposes of sale of the produced gas.

The cyclonic separator vessel also has application in the separation of gases and liquids for other purposes and for separation of solids from liquids or gases. The vessel also finds application in separation of certain liquids from other liquids, i.e. immiscible liquids of differing specific gravity. For purposes of simplicity, the centrifugal separator vessel of this invention is discussed herein particularly in its application in conjunction with a gas flow measurement system such as for flowlines from producing natural gas wells.

BRIEF DESCRIPTION OF THE DRAWINGS

So that the manner in which the above-recited features, advantages and objects of the present invention, as well as others which will become apparent, are attained and can be understood in detail, a more particular description of the invention, briefly summarized above, may be had by reference to the embodiments thereof illustrated in the appended drawings, which drawings form a part of this specification.

It is to be noted, however, that the appended drawings illustrate only typical embodiments of this invention and are not to be considered limiting of its scope, for the invention may admit to other equally effective embodiments.

In the Drawings

FIG. 1 is a pictorial representation of a gas flow measurement system incorporating a centrifugal separator flow stabilization vessel and back-pressure control constructed in accordance with the present invention.

FIG. 2 is a sectional view showing the centrifugal separator vessel of FIG. 1 in greater detail.

FIG. 3 is a sectional view of a centrifugal separator vessel representing an alternative embodiment of the present invention.

DETAILED DESCRIPTION OF PREFERRED EMBODIMENT

Figure 1:
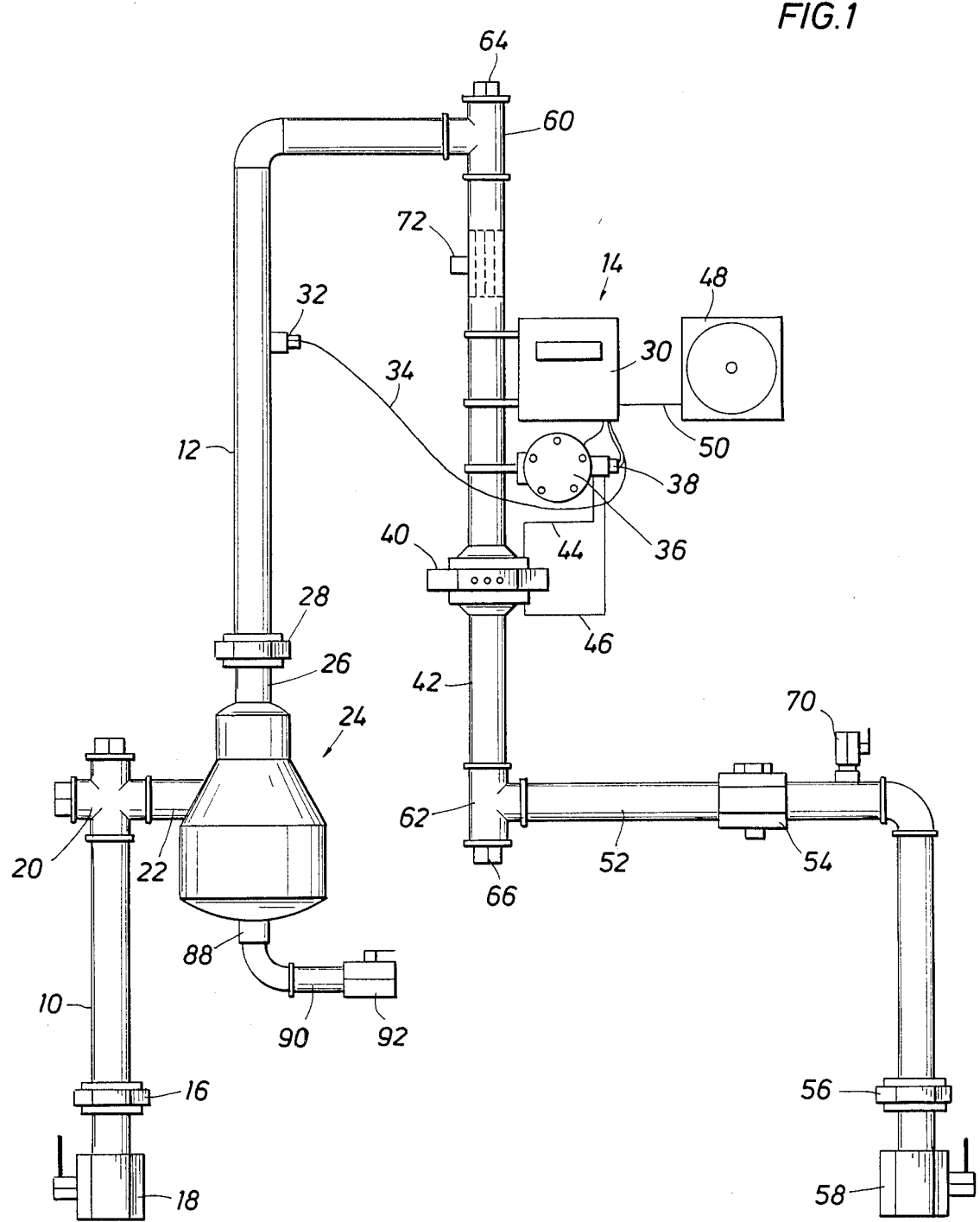

Referring now to the drawings and first to FIG. 1, a flowline is shown at 10 and 12 which conducts gas to flow measurement equipment illustrated generally at 14. The flowline section 10 may be provided with a conventional threaded union 16 enabling the flowline to be disconnected as desired. Upstream of the flowline section 10 may be provided a control valve 18 for closing the flowline to enable the threaded union 16 to be disconnected. The flowline section 10 is connected to a cross-type pipe fitting or coupling, which is also coupled with a pipe section 22 extending from a centrifugal separator vessel shown generally at 24. The tube 22 functions as an inlet tube for flow of gas into the separator vessel while an outlet tube shown at 26 provides for discharge of gas from the vessel. Coupled between the outlet tube 26 and the flow line section 12 is a restriction union 28 permitting maintenance of a preselected back-pressure within the vessel. The restriction union 28 incorporates an internal restriction, not shown, which is of smaller dimension than the dimension of the flow line passage, thus maintaining a back-pressure condition within the vessel. For changing the back-pressure condition, the restriction union may be disassembled and a different orifice plate inserted therein having a different size orifice across which the gas must flow from the separator vessel into the flowline section 12. The restriction union 28 may be of the type manufactured by Clayton Marks and which is widely used in the petroleum industry.

An electronic flow measurement device is shown at 30 which may take any convenient form for accurate measurement of gas flow. The flowline section 12 is provided with a temperature transmitter 32 having a conductor 34 coupled with the electronic flow computer. A pressure transmitter 38 and a differential pressure transmitter 36 are also provided which are electrically coupled with the electronic flow computer 30. An orifice fitting 40 is provided in the flowline section 42 and includes an internal orifice plate providing an orifice or restriction across which the gas must flow. The orifice fitting defines pressure taps 44 and 46, which are coupled with the differential pressure transmitter 36. The temperature signal from transmitter 32, a pressure signal from transmitter 38 and a differential pressure signal from transmitter 36 are conducted to the electronic flow computer 30 which processes these signals and yields a digital or analog signal representing gas flow. A chart recorder may be provided as shown at 48 which is coupled by a conductor 50 to the electronic flow computer. The chart recorder 48, which in this case is shown to be of the rotary sheet type, is marked by one or more ink pens to represent the volume of gas flow at any particular time. The ink pens are coupled with the flow computer circuitry and fluctuate according to varying conditions of gas flow. The chart also shows fluctuations in the conditions of flow during the particular time period represented by the chart.

Downstream of the flow measurement equipment, the flowline 42 may include a flowline section 52 provided with a check valve 54 for eliminating back-pressure and reverse flow and it may also be provided with a threaded union 56 enabling the flow line to be easily disconnected. Typically, a control valve 58 will be coupled to the flow line downstream of the threaded coupling to thereby provide for shutting off the flowline in the event the flowline upstream thereof is to be disconnected such as for servicing. The flowline may also be provided with threaded Tee fittings 60 and 62, such as on the straight run of the flowline section 42, which Tee fittings may be provided with closure plugs 64 and 66 enabling the flowline section 42 to be opened and inspected or cleaned without requiring disconnection of its components. For servicing or cleaning, of course, the control valves 18 and 58 would be closed before the closure plugs 64 and 66 are removed. To bleed down the flowline system with the valves 18 and 58 closed, a bleeder valve may be provided such as shown at 70. The flowline run 42 may also be provided with a straightening vane with retainer 72.

Figure 2:
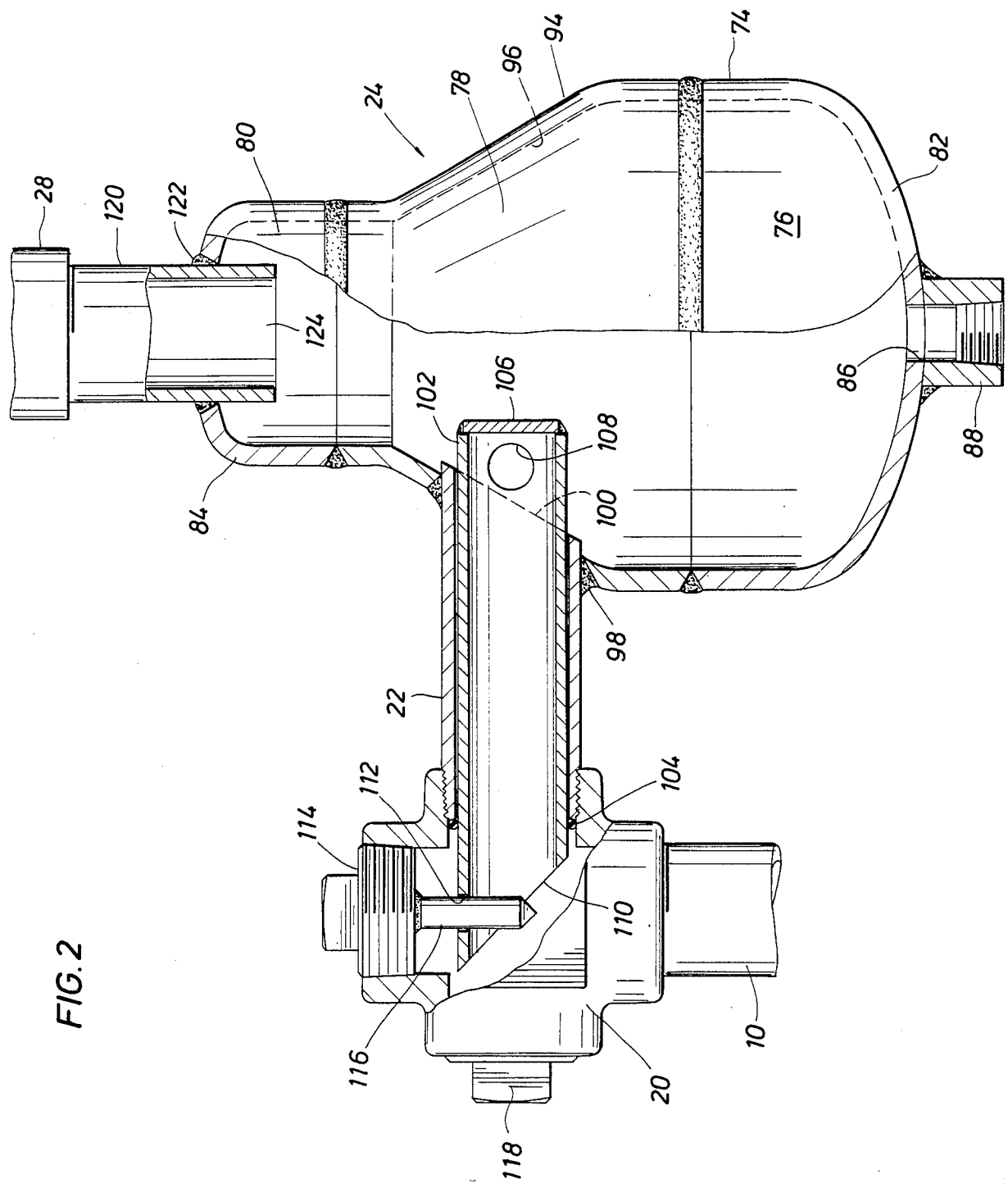

Referring now to FIG. 2, the separator vessel 24 incorporates a housing structure 74 defining a lower sump section 76, an intermediate fluidic column section 78 and an upper outlet section 80. The lower sump section of the vessel may be formed by a conventional large sized weld cap 82 while a smaller conventional well cap 84 may define at least a portion of the upper, outlet section of the vessel. The weld cap 82 is formed to define a lower drain opening 86 about which is connected a drain fitting 88 to which a drain line 90, such as shown in FIG. 1, is coupled. A drain valve, as at 92 in FIG. 1, may be provided to enable controlled draining of liquid and solid contaminant materials from the sump. The drain valve 92 may conveniently take a manual form, as shown, or in the alternative, may be automatically controlled responsive to the volume of contaminant accumulation within the flow stabilization vessel.

The intermediate, fluidic column portion of the flow stabilization vessel may include a generally tapered weld section 94 commercially available in the industry and generally referred to as a reducer. The upper and lower extremities of the reducer prepared for welded connection to the upper and lower weld caps 84 and 82, respectively. The fluidic column section 94 defines a flared or frusto-conical internal surface which may have other tapered form without departing from the spirit and scope of this invention. The connector tube 22 may be coupled with the fluidic column section 94 by welding, as shown at 98, and defines an inclined extremity 100 having an inclination substantially corresponding to the taper of the frusto-conical surface 96. A flow restrictor element 102 extends through the connector tube and is sealed with respect to the connector tube by a circular sealing element 104. The flow restrictor element defines a closed end wall 106 and a restricted orifice 108 in one side wall only thereof, the orifice being located in close proximity to the tapered surface 96 of the fluidic column section. The orifice 108 is positioned to direct a flow of high velocity gas in substantially normal relation to the vertical and which impinges with the tapered surface 96 so that the circular aspect of the tapered surface directs the high velocity flow to a circular path.

At its opposite extremity, the flow restrictor element 102 is inclined as shown at 110 and forms a location aperture 112. A closure plug member 114, received by the cross coupling member 20, is provided with a locating pin 116, which extends through the aperture 112 of the flow restrictor element, thus maintaining positive alignment of the flow restrictor within the tube 102 to thus maintain accurate alignment of the orifice 108 with respect to the internal tapered wall surface 96 of the fluidic column section. The cross-coupling or fitting 20 is also provided with a threaded closure member 118 which may be removed to permit replacement of the flow restrictor element 102. In the event it should become desirable to change the dimension of the orifice 108, the closure plugs 114 and 118 would be removed, thereby permitting extraction of the flow restrictor element from the passage within which it is positioned. A replacement flow restrictor element with a proper sized orifice may then be inserted through the tube 22 and secured by replacing the closure member 114 with the locator pin 116 extended through the location aperture 112.

In operation, a jet of high velocity gas exits from the aperture 108 and is directed in horizontal relation against the internal frusto-conical surface 96. Surface 96 then causes the gas to assume a cyclonic circulation within the fluidic column section 78, thus causing heavier material, such as any solid and liquid components contained within the gas, to move radially outwardly to the frusto-conical surface 96. The lighter components of the flowing gas, i.e. the gas itself, exclusive of the contaminants, will be located at the lower pressure central portion of the cyclonic gas circulation which is located at the central portion of the vessel. The separated solid and liquid contaminants will flow downwardly along the wall surfaces of the vessel and into the sump section 76.

An outlet tube member 120 is connected to the upper portion of the vessel, particularly to the upper weld cap 84, the connection being established by a circular weld 122. The outlet tube 120, which is conveniently in the form of a section of pipe of essentially the same dimension as the flowline, extends downwardly into the flow stabilization vessel positioning an outlet opening 124 thereof in substantially centralized relation with respect to the cyclonic circulation occurring within the vessel. Any solid constituents being centrifugally separated from the gas at the upper portion of the vessel, therefore, will be directed outwardly to the wall surfaces of the vessel and will not enter the outlet opening 24. The gas exiting the outlet tube 120 will, therefore, be substantially free of any contaminant matter. The back-pressure union 28 will be connected to the upper extremity of the outlet tube 120, thereby placing its restriction immediately downstream of the flow stabilization vessel 24. The restriction union 28 provides back-pressure within the flow stabilization vessel to cause the vessel to serve an accumulator function, thus absorbing and dampening minor fluctuations in conditions of gas flow, and thereby permitting stabilized gas flow in that portion of the flowline 12–42, as shown in FIG. 1, where temperature and pressure sensing occurs. Further, any contaminants in the flowing gas are excluded by the centrifugal separation principles of the fluidic column section 78. This stabilized flow develops stable flow signals across the orifice of the orifice fitting which are detected by the electronic flow computer 30 and by the chart recording device 48, resulting in accurate correlation between the electronic flow computer and chart. Specifically, the chart apparatus will describe an ink line on the chart which is quite narrow, thereby providing personnel with the capability of accurately interpreting the chart and correlating it with the results of the electronic flow computer.

Referring now to FIG. 3, an alternative form of the invention is shown which includes a flow stabilization vessel 130 of essentially the same general construction as described above in accordance with FIG. 2. The flow stabilization vessel 130 is provided with a sump section 132, a fluidic column section 134 and an outlet section 136. Inlet of flowing gas into the vessel 130 is accomplished through a conduit section 138 which extends into the vessel and is welded thereto as shown at 140. The conduit section 138 may be coupled directly to the flowline by a conventional threaded union or by a Tee or crosscoupling of conventional nature. The inner extremity of the pipe section 138 is closed by means of a closure plate 142 connected thereto by a circular weld 144. The tubular conduit defines a gas jet aperture 146 on one side thereof which is positioned in close proximity to the internal frusto-conical wall surface 148 defined by the internal fluidic column section 134. A high velocity jet of flowing gas exiting from the aperture 146 impinges in horizontal manner against the frusto-conical wall surface 148 and thereby generates a cyclonic gas flow activity within the vessel 130. This cyclonic gas flow condition causes liquid and solid separation from the flowing gas in the manner discussed above and thereby permits only the gas to flow through the outlet conduit 150. Again, the outlet conduit is connected by a circular weld 152 to the upper portion of the vessel structure and extends downwardly into the vessel positioning an outlet opening 154 in centralized relation within the upper portion of the vessel. Thus, solid and liquid contaminants separated from the flowing gas in the upper portion of the vessel cannot enter the outlet opening but are caused to collect on the inner wall surface of the vessel and flow downwardly into the sump section 132. The gas then flows upwardly through the outlet conduit 150 and through a back-pressure control device 156 of the same nature shown at 28 in FIG. 2 to the flowline 12 as shown in FIG. 1.

The vessel 130 is also provided with a lower drain opening 158 and a coupling member 160 welded to the lower weld cap portion of the vessel, such as shown at 162.

From the foregoing, it is apparent that the present invention sets forth centrifugal separator vessel which finds particular application in a gas flow stabilization system for a gas flow measurement system and has other applications as well. When utilized in conjunction with gas flow measurement systems, the separator vessel provides for measurement of stabilized gas flow from an otherwise rapidly fluctuating source such as the flowline of a producing natural gas well, for example. The centrifugal separator vessel in this case take the form of a flow stabilization vessel which provides the function of centrifugal separation for separation of contaminants from the flowing gas, provides a fluidic column for establishing cyclonic flow of gas within the vessel and provides a back-pressure control within the vessel for stabilized flow in the flow measurement system. The separator vessel of this invention is of relatively small, quite stable construction and is of low cost, as well as providing exceptional reliability. The centrifugal separator disclosed herein has novelty in its general design for gas, liquid, solid contaminant separation and it also has novelty in conjunction with the apparatus disclosed herein specifically for stabilization of gas flow to enhance accuracy of flow measurement systems. Its simplicity also effectively promotes its serviceability and low cost and thereby maximizes its competitive advantage in the market.

While there has been shown and described both preferred and alternative embodiments constructed in accordance with the present invention, it will be appreciated that many changes and modifications may be made therein without, however, departing from the essential spirit thereof.

Having thus described this invention in detail, we hereby claim:

1. A flow stabilization mechanism adapted to be coupled into a gas flowline upstream of flow measurement equipment for separation of liquid material and solid particulate from flowing gas and developing a back pressure to gas flow to minimize rapid fluctuations of flowing gas being measured, comprising:
   (a) vessel wall structure having a small diameter upper annular portion, a large diameter lower annular portion and a downwardly diverging tapered intermediate annular portion interconnecting said upper and lower annular portions, said vessel wall structure defining vessel chamber means;
   (b) said vessel wall structure of said downwardly diverging intermediate annular portion forming generally conical surface means defining fluidic column means within said vessel chamber means;
   (c) inlet passage means interconnected with said intermediate annular portion of said vessel wall structure and extending into said vessel chamber means and adapted to be coupled with said flowline, said inlet means defining a restricted gas jet orifice of smaller dimension than the flow path dimension of said inlet passage means and directing flowing gas within said fluidic column means in the form of a jet directed at a shallow tangential angle to said generally conical surface means of said vessel wall structure and at increased velocity in comparison with the velocity of gas flow through said inlet passage means, thereby generating cyclonic circulation of gas within said intermediate annular portion of said vessel chamber means;
   (d) said large diameter lower annular portion of said vessel wall structure defining sump means forming a portion of said vessel chamber means and being located below said fluidic column means, said sump means having outlet means for removal of liquid material and solid contaminants separated from said flowing gas in said fluidic column means; and
   (e) outlet passage means extending through said small diameter upper annular portion of said vessel wall structure and defining an outlet opening located centrally of said small diameter upper annular portion and above the upper extremity of said generally conical surface means and in spaced relation with said vessel wall structure, said outlet passage means adapted to be coupled with said flowline.

2. A flow stabilization mechanism as recited in claim 1, wherein:

said outlet passage means is formed by a conduit defining an outlet passage extending from the upper portion of said vessel wall structure and positioning said outlet opening within said vessel chamber means and in substantially centered relation with the axis of rotation of said cyclonic circulation of gas.

3. A flow stabilization mechanism as recited in claim 1, wherein:

said outlet passage means defines an outlet opening positioned in substantially axially registered relation with said fluidic column means and located within said vessel chamber means in spaced relation with internal wall surfaces defined by said small diameter upper annular portion of said vessel wall structure.

4. A flow stabilization mechanism as recited in claim 1, including:

back pressure control means located in said outlet passage for maintaining a predetermined range of back pressure within said vessel chamber means.

5. A flow stabilization mechanism as recited in claim 1 wherein:

said back-pressure control means comprises a restriction to gas flow immediately downstream of said outlet means.

6. A flow stabilization mechanism as recited in claim 1, wherein:

(a) said inlet passage means is releasably received in assembly with said downwardly diverging intermediate annular portion of said vessel wall structure and forms an inlet orifice establishing orientation and velocity of said jet of flowing gas, such replaceable nature thus permitting selection of the dimension and orientation of said orifice thereof; and (b) inlet passage orienting means secures said inlet passage means against misalignment relative to said vessel wall structure.

7. A flow stabilization mechanism adapted to be coupled into a gas flowline upstream of flow measurement equipment for separation of liquid material and solid particulate from flowing gas and developing a back pressure to gas flow to minimize rapid fluctuations of flowing gas being measured, comprising:

(a) vessel wall structure of at least partially circular form defining vessel chamber means;

(b) surface means of circular cross-sectional dimension defining fluidic column means within said vessel chamber means;

(c) inlet passage means extending into said vessel chamber means and adapted to be coupled with said flowline, said inlet means defining a restricted gas jet orifice of smaller dimension than the flow path dimension of said inlet passage means and directing flowing gas within said fluidic column means in the form of a jet directed at a shallow tangential angle to said vessel wall and at increased velocity in comparison with the velocity of gas flow through said inlet passage means, thereby generating cyclonic circulation of gas within said vessel chamber means, said inlet passage means comprising:

(1) a tubular connector extending into said vessel and adapted for connection to said flowline;

(2) a tubular inlet element extending through said tubular connector and having a closed end positioned within said fluidic column means, said tubular inlet element defining a restricted orifice in a side portion thereof; and (3) means maintaining preselected orientation of said restricted orifice within said vessel chamber means;

(d) sump means forming a portion of said vessel chamber means and having at least a portion thereof located below said fluidic column means, said sump means having outlet means for removal of liquid material and solid contaminants separated from said flowing gas in said fluidic column means; and (e) outlet passage means extending into the upper portion of said vessel chamber means in spaced relation with said vessel wall and adapted to be coupled with said flowline, said outlet means defining outlet opening means located to receive the central portion of said cyclonic circulation of gas.

8. A flow stabilization mechanism as recited in claim 7 wherein said preselected orientation maintaining means comprises:

(a) a locator opening defined in said tubular inlet element; and (b) a locator pin adapted to be positioned in fixed relation with respect to said tubular connector, said locator pin extending through said locator opening and securing said tubular inlet element against movement within said tubular connector.

9. The improvement of claim 7, wherein:

said centrifugal separator vessel is of a volumetric dimension forming accumulator means dampening pressure surges in the natural gas flowing therethrough.

10. The improvement of claim 7, wherein:

said outlet passage means is defined by a pipe section of substantially common dimension with that of said flowline and extending substantially vertically into the upper extremity of said vessel wall structure, thus locating the opening of said pipe section in centralized relation within said vessel chamber means and in close proximity to the upper extremity of said generally conical section of said vessel wall structure.

11. A fluid separator vessel as recited in claim 7, wherein:

(a) said fluidic column means defines a flared internal surface having a lower extremity of larger dimension than the upper extremity thereof;

(b) said sump means is located at least partially below said flared internal surface and receives any liquid and solid contaminants separated from the flowing cyclonic circulation of fluid in said fluidic column means;

(c) said vessel chamber means defines an upper outlet section located at least partially above said flared internal surface; and (d) said outlet means extends into said vessel chamber means and defines an outlet opening located in substantially centralized manner with respect to said upper extremity of said flared internal surface and in spaced relation with internal wall surfaces of said vessel wall structure.

12. The flow stabilization mechanism as recited in claim 7, wherein:

(a) said vessel wall structure defines a downwardly diverging generally frusto-conical wall section defining generally frusto-conical wall means having a lower extremity of larger dimension than the upper extremity thereof;

(b) said tubular inlet element is oriented to direct the flow of incoming gas in generally tangential relation within said generally frusto-conical section to thus develop cyclonic gas flow activity within said generally frusto-conical section for separation of solids and liquids from said incoming gas;

(c) said outlet passage means extending into the upper portion of said vessel chamber means and defining an outlet opening positioned near the upper extremity of said generally frusto-conical section and being coupled with said flowline.

13. The improvement of claim 12, wherein:
(a) said gas inlet passage means is defined by a pipe section of substantially common size with said flowline, said pipe section extending into said intermediate generally frusto-conical section and having a closed end located within said vessel chamber means; and
(b) said restricted orifice being formed in a wall of said pipe section and being located within said generally frusto-conical section and in close proximity with the inner surface of said generally frusto-conical section.

14. The improvement of claim 12, wherein:
(a) said vessel wall structure defines an intermediate generally frusto-conical section oriented in downwardly diverging position; and
(b) said gas inlet passage means forms a restricted orifice in comparison to the dimension of said flowline and is oriented to direct a jet of high velocity flowing gas along the inner surface of said intermediate generally frusto-conical section for development of said cyclonic circulation of gas within said vessel chamber means.

15. The improvement of claim 14, wherein:
(a) said sump means is located below said lower extremity of said generally conical section, said sump means receiving contaminant liquid and solid matter separated from the flowing gas within said fluidic column means; and
(b) valve controlled drain means being provided in said sump means.

16. A flow stabilization mechanism as recited in claim 7, wherein:
said outlet means defines an outlet passage extending from the upper portion of said vessel wall structure and positioning said outlet opening within said vessel chamber means in substantially centered relation with the axis of rotation of said cyclonic circulation of fluid and intermediate the upper and lower ends of said vessel chamber means.

17. A flow stabilization mechanism as recited in claim 16, wherein:
said outlet means defines an outlet opening positioned in substantially axially registered relation with said fluidic column means located within said vessel chamber means in spaced relation with internal wall surfaces defined by said vessel wall structure.

18. A fluid separator vessel as recited in claim 16, wherein said fluid column means comprises:
(a) means defining a generally flared surface within said vessel chamber means and having its larger extremity directed downwardly; and
(b) said inlet means directing high velocity inlet fluid flow along a path oriented transverse to the axis about which said generally flared surface is generated and along said generally flared surface, said generally flared surface causing said inlet fluid flow to develop said cyclonic circulation of said fluid.

* * * * *